United States Patent
Bunker

(10) Patent No.: US 10,267,169 B2
(45) Date of Patent: Apr. 23, 2019

(54) ANGLED IMPINGEMENT INSERTS WITH COOLING FEATURES

(71) Applicant: General Electric Company, Schenectady, NY (US)

(72) Inventor: Ronald Scott Bunker, West Chester, OH (US)

(73) Assignee: General Electric Company, Schenectady, NY (US)

(*) Notice: Subject to any disclaimer, the term of this patent is extended or adjusted under 35 U.S.C. 154(b) by 820 days.

(21) Appl. No.: 14/713,110

(22) Filed: May 15, 2015

(65) Prior Publication Data
US 2016/0333735 A1 Nov. 17, 2016

(51) Int. Cl.
*F01D 9/02* (2006.01)
*F01D 5/18* (2006.01)
(Continued)

(52) U.S. Cl.
CPC ............ *F01D 9/023* (2013.01); *F01D 5/187* (2013.01); *F01D 9/065* (2013.01); *F23R 3/002* (2013.01); *F23R 3/005* (2013.01); *F05D 2240/35* (2013.01); *F05D 2250/11* (2013.01); *F05D 2250/12* (2013.01); *F05D 2250/121* (2013.01); *F05D 2250/132* (2013.01);
(Continued)

(58) Field of Classification Search
CPC .......... F01D 25/12; F01D 25/14; F01D 5/186; F01D 5/187; F01D 9/023; F01D 9/04; F01D 9/041; F23R 3/002; F23R 3/005; F05D 2220/32; F05D 2240/35; F05D 2250/11; F05D 2250/121; F05D 2250/14; F05D 2250/90; F05D 2260/201; F05D 2260/202; F05D 2260/221
See application file for complete search history.

(56) References Cited

U.S. PATENT DOCUMENTS

| 4,293,275 | A | 10/1981 | Kobayashi et al. |
| 4,416,585 | A | 11/1983 | Abdel-Messeh |
(Continued)

FOREIGN PATENT DOCUMENTS

| EP | 0648979 A1 | 4/1995 |
| EP | 1284338 A2 | 2/2003 |
(Continued)

OTHER PUBLICATIONS

Curtis Walton Stover et al., U.S. Appl. No. 14/860,801, filed Sep. 22, 2015.
(Continued)

*Primary Examiner* — Logan Kraft
*Assistant Examiner* — Eric Zamora Alvarez
(74) *Attorney, Agent, or Firm* — General Electric Company; William Andes

(57) ABSTRACT

An engine component assembly is provided with an insert having cooling features. The engine component comprises a cooled engine component surface having a flow path on one side thereof and a second component adjacent to the first component. The second component, for example an insert, may have a plurality of openings forming an array wherein the openings extend through the second component at a non-orthogonal angle to the surface of the second component. The second engine component has a plurality of discrete cooling features disposed on a surface facing the first component and near the plurality of cooling openings.

5 Claims, 10 Drawing Sheets

(51) Int. Cl.
*F23R 3/00* (2006.01)
*F01D 9/06* (2006.01)

(52) U.S. Cl.
CPC .... *F05D 2250/14* (2013.01); *F05D 2250/141* (2013.01); *F05D 2250/21* (2013.01); *F05D 2250/22* (2013.01); *F05D 2250/221* (2013.01); *F05D 2250/23* (2013.01); *F05D 2250/231* (2013.01); *F05D 2250/232* (2013.01); *F05D 2250/24* (2013.01); *F05D 2250/241* (2013.01); *F05D 2260/201* (2013.01); *F05D 2260/202* (2013.01); *F05D 2260/2212* (2013.01); *F23R 2900/03044* (2013.01); *F23R 2900/03045* (2013.01); *Y02T 50/673* (2013.01); *Y02T 50/676* (2013.01)

(56) References Cited

U.S. PATENT DOCUMENTS

| | | | |
|---|---|---|---|
| 4,474,532 A | 10/1984 | Pazder | |
| 4,515,526 A | 5/1985 | Levengood | |
| 4,775,296 A | 10/1988 | Schwarzmann et al. | |
| 5,271,715 A | 12/1993 | Zelesky et al. | |
| 5,288,207 A | 2/1994 | Linask | |
| 5,353,865 A | 10/1994 | Adiutori et al. | |
| 5,395,212 A | 3/1995 | Anzai et al. | |
| 5,533,864 A | 7/1996 | Nomoto et al. | |
| 5,611,662 A | 3/1997 | Cunha | |
| 5,615,546 A | 4/1997 | Althaus et al. | |
| 5,681,144 A | 10/1997 | Spring et al. | |
| 5,704,763 A | 1/1998 | Lee | |
| 6,000,908 A | 12/1999 | Bunker | |
| 6,099,251 A | 8/2000 | Lafleur | |
| 6,174,134 B1 | 1/2001 | Lee et al. | |
| 6,254,346 B1 | 7/2001 | Fukuno et al. | |
| 6,290,462 B1 | 9/2001 | Ishiguro et al. | |
| 6,331,098 B1 | 12/2001 | Lee | |
| 6,406,260 B1 | 6/2002 | Trindade et al. | |
| 6,416,283 B1 | 7/2002 | Johnson et al. | |
| 6,582,584 B2 | 6/2003 | Lee et al. | |
| 6,607,355 B2 | 8/2003 | Cunha et al. | |
| 6,609,884 B2 | 8/2003 | Harvey | |
| 6,644,921 B2 | 11/2003 | Bunker et al. | |
| 6,722,134 B2 | 4/2004 | Bunker | |
| 6,837,683 B2 | 1/2005 | Dailey | |
| 6,890,154 B2 | 5/2005 | Cunha | |
| 6,905,301 B2 | 6/2005 | Tiemann | |
| 6,916,150 B2 | 7/2005 | Liang | |
| 6,932,573 B2 | 8/2005 | Liang | |
| 6,939,102 B2 | 9/2005 | Liang | |
| 6,981,846 B2 | 1/2006 | Liang | |
| 6,984,102 B2 | 1/2006 | Bunker et al. | |
| 7,094,031 B2 | 8/2006 | Lee et al. | |
| 7,104,757 B2 | 9/2006 | Gross | |
| 7,128,533 B2 | 10/2006 | Liang | |
| 7,137,781 B2 | 11/2006 | Harvey et al. | |
| 7,186,084 B2 | 3/2007 | Bunker et al. | |
| 7,195,458 B2 | 3/2007 | Liang | |
| 7,300,242 B2 | 11/2007 | Liang | |
| 7,399,160 B2 | 7/2008 | Harvey et al. | |
| 7,413,407 B2 | 8/2008 | Liang | |
| 7,445,432 B2 | 11/2008 | Levine et al. | |
| 7,520,723 B2 | 4/2009 | Liang | |
| 7,534,089 B2 | 5/2009 | Liang | |
| 7,547,191 B2 | 6/2009 | Liang | |
| 7,637,720 B1 | 12/2009 | Liang | |
| 7,665,965 B1 | 2/2010 | Liang | |
| 7,690,892 B1 | 4/2010 | Liang | |
| 7,699,583 B2 | 4/2010 | Cunha | |
| 7,713,026 B1 | 5/2010 | Liang | |
| 7,722,327 B1 | 5/2010 | Liang | |
| 7,766,616 B2 | 8/2010 | Baldauf et al. | |
| 7,806,658 B2 | 10/2010 | Liang et al. | |
| 7,824,156 B2 | 11/2010 | Dellmann et al. | |
| 7,866,948 B1 | 1/2011 | Liang | |
| 7,938,624 B2 | 5/2011 | Tibbott | |
| 7,985,050 B1 | 7/2011 | Liang | |
| 8,297,926 B2 | 10/2012 | Grobeta | |
| 8,408,872 B2 | 4/2013 | Briggs et al. | |
| 8,439,639 B2 | 5/2013 | Joe et al. | |
| 2006/0099073 A1 | 5/2006 | Djeridane et al. | |
| 2007/0243065 A1 | 10/2007 | Devore et al. | |
| 2007/0297916 A1 | 12/2007 | Levine et al. | |
| 2007/0297917 A1 | 12/2007 | Levine et al. | |
| 2008/0115506 A1 | 5/2008 | Patel et al. | |
| 2008/0131262 A1 | 6/2008 | Lee et al. | |
| 2009/0087312 A1 | 4/2009 | Bunker et al. | |
| 2010/0040480 A1 | 2/2010 | Webster et al. | |
| 2010/0221121 A1 | 9/2010 | Liang | |
| 2010/0226761 A1 | 9/2010 | Liang | |
| 2010/0226791 A1 | 9/2010 | Fujimura et al. | |
| 2010/0247328 A1 | 9/2010 | Cunha | |
| 2010/0303635 A1 | 12/2010 | Townes et al. | |
| 2011/0027102 A1 | 2/2011 | Nakamata et al. | |
| 2011/0038709 A1 | 2/2011 | Liang et al. | |
| 2011/0164960 A1 | 7/2011 | Maldonado | |
| 2011/0188993 A1 | 8/2011 | Bacha et al. | |
| 2012/0177478 A1 | 7/2012 | Giri et al. | |
| 2013/0081401 A1 | 4/2013 | Kim | |
| 2014/0109577 A1 | 4/2014 | Lee et al. | |

FOREIGN PATENT DOCUMENTS

| | | |
|---|---|---|
| EP | 2087206 B1 | 3/2010 |
| EP | 2172708 A2 | 4/2010 |
| EP | 2235328 A1 | 10/2010 |
| EP | 2505787 A1 | 10/2012 |
| EP | 2538137 A2 | 12/2012 |
| EP | 2549188 A2 | 1/2013 |
| EP | 2573464 A2 | 3/2013 |
| EP | 2700877 A2 | 2/2014 |
| EP | 2778369 A1 | 9/2014 |
| JP | 03182602 A | 8/1991 |
| JP | 08338202 A | 12/1996 |
| JP | 3040590 B2 | 5/2000 |
| JP | 3124109 B2 | 1/2001 |
| JP | 3586637 B2 | 11/2004 |
| WO | 2011156078 A1 | 12/2011 |
| WO | 2013123115 A1 | 8/2013 |

OTHER PUBLICATIONS

Phebe Helena Preethi et al., U.S. Appl. No. 62/004,685, filed May 29, 2014.
Robert Frederick Bergholz et al., U.S. Appl. No. 62/073,527, filed Oct. 31, 2014.
Ambarish Jayant Kulkarni et al., U.S. Appl. No. 62/004,697, filed May 29, 2014.
Ronald Scott Bunker et al., U.S. Appl. No. 62/004,709, filed May 29, 2014.
Ronald Scott Bunker et al., U.S. Appl. No. 14/717,547, filed May 20, 2015.
Ronald Scott Bunker et al., U.S. Appl. No. 62/073,449, filed Oct. 31, 2014.
Ronald Scott Bunker et al., U.S. Appl. No. 14/989,290, filed Jan. 6, 2016.
PCT Search Report and Written Opinion issued in connection with related PCT Application No. PCT/US2015/032597 dated Feb. 25, 2016.
PCT Search Report and Written Opinion issued in connection with Related Application No. PCT/US2015/057708 dated Jun. 17, 2016.
PCT Search Report and Written Opinion issued in connection with related Application No. PCT/US2015/057577 dated Jan. 14, 2016.
European Search Report and Opinion issued in connection with corresponding EP Application No. 15168849.6 dated Oct. 28, 2015.
European Search Report and Opinion issued in connection with corresponding EP Application No. 15169174.8 dated Oct. 28, 2015.
PCT Search Report and Written Opinion issued in connection with corresponding PCT Application No. PCT/US2015/032592 dated Oct. 29, 2015.

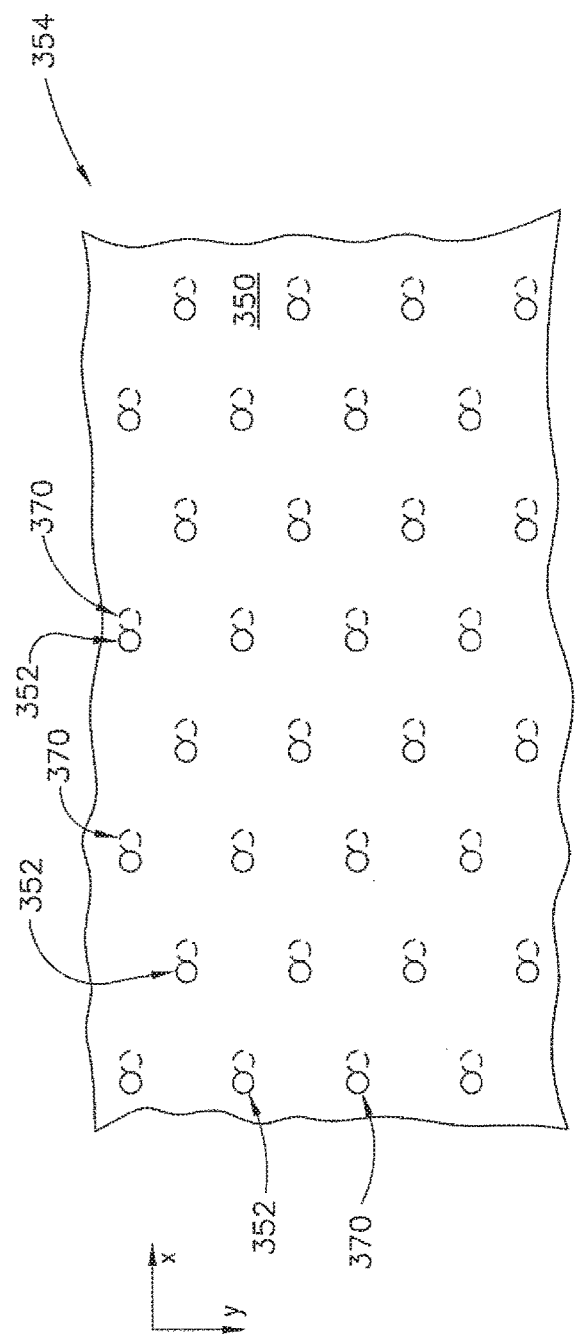
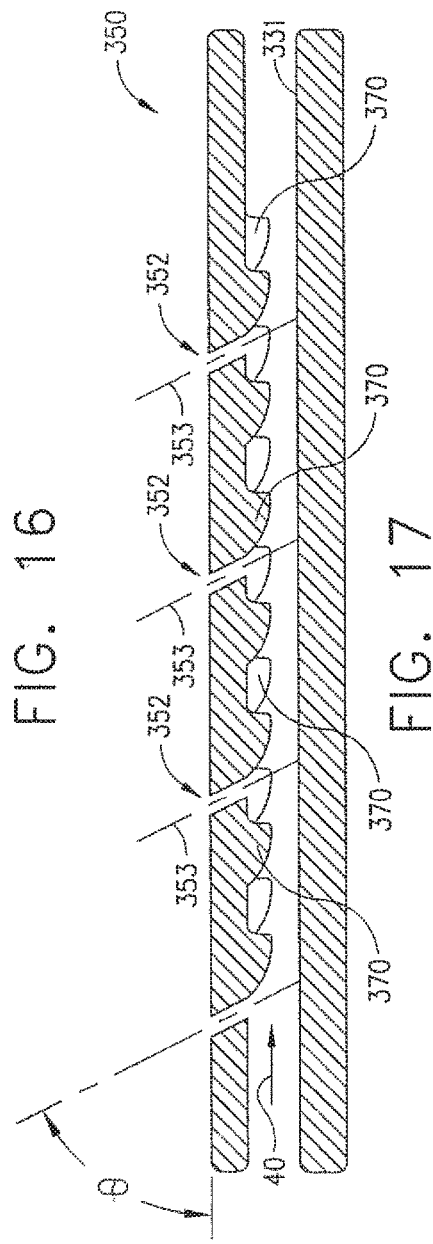
FIG. 16
FIG. 17

ANGLED IMPINGEMENT INSERTS WITH COOLING FEATURES

CROSS-REFERENCE TO RELATED APPLICATION

This application claims priority to U.S. Provisional Application Ser. No. 62/004,718, filed May 29, 2014, the disclosure of which is incorporated herein by reference.

BACKGROUND

The technology described herein relates to angled impingement openings for reducing or mitigating particulate accumulation. More specifically, present embodiments relate to, without limitation, an array of openings in an insert of an engine component.

Most operating environments of a gas turbine engine receive particulate material into the engine. Such particulate can have various detrimental effects in the engine.

The accumulation of dust, dirt or other particulate matter in gas turbine engines or turbo-machinery reduces the efficiency of the machinery, as well as reducing the effectiveness of the cooling which occurs within the engine. The particulate may insulate components of the engine which lead to the increasing component temperature therein. Particulate can also block or plug apertures utilized for cooling components within the engine which further leads to decreased functionality or effectiveness of the cooling circuits within the engine components or hardware.

Accumulation of particulate is in part due to stagnation and/or recirculation of air flow within cooling circuits. Prior efforts to resolve particulate accumulation problems have included additional flow through the engine components so as to increase surface cooling. This has deemphasized internal cooling feature effectiveness but utilizes more compressed air which would alternatively be directed into the core for improving performance and output of the gas turbine engine.

It would be desirable to reduce or eliminate the factors leading to the increased temperature or decreased cooling effectiveness of the engine components. It would further be desirable to decrease the amount of particulate accumulation and decrease stagnation or low momentum of air flow so that particulate does not accumulate in the aircraft engine.

The information included in this Background section of the specification, including any references cited herein and any description or discussion thereof, is included for technical reference purposes only and is not to be regarded subject matter by which the scope of the invention is to be bound.

BRIEF DESCRIPTION

According to some embodiments, an engine component assembly is provided with an insert having cooling features. The engine component comprises a cooled engine component surface having a cooling flow path on one side thereof and a second component adjacent to the first component. The second component, for example an insert, may have a plurality of openings forming an array wherein the openings extend through the second component at a non-orthogonal angle to the surface of the second component. The second engine component has a plurality of discrete cooling features disposed on a surface facing the first component and near the plurality of cooling openings.

According to some embodiments, an engine component assembly for impingement cooling comprises an engine component having a cooled surface, the engine component having a flow path on one side of the cooled surface, an insert disposed adjacent to the engine component between the flow path and the engine component, the insert having a plurality of openings forming an array through the insert, the cooling flow path passing through the plurality of openings to cool the cooled surface, the insert having a surface facing said cooled surface of the engine component, a plurality of discrete cooling features extending from the insert surface into a gap between and toward the cooled surface of the engine component and, the openings extending through the insert at a non-orthogonal angle to the insert surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages is provided in the following written description of various embodiments, illustrated in the accompanying drawings, and defined in the appended claims.

BRIEF DESCRIPTION OF THE DRAWINGS

The above-mentioned and other features and advantages of these exemplary embodiments, and the manner of attaining them, will become more apparent and the methods and material for forming an angled impingement insert with cooling features will be better understood by reference to the following description of embodiments taken in conjunction with the accompanying drawings, wherein:

FIG. 16 is a top view of an alternate array having uniform spacing and cooling apertures impinging upon the cooled surface of the engine component; and, FIG. 17 is a side section view of the embodiment of FIG. 16.

DETAILED DESCRIPTION

Figure 1:
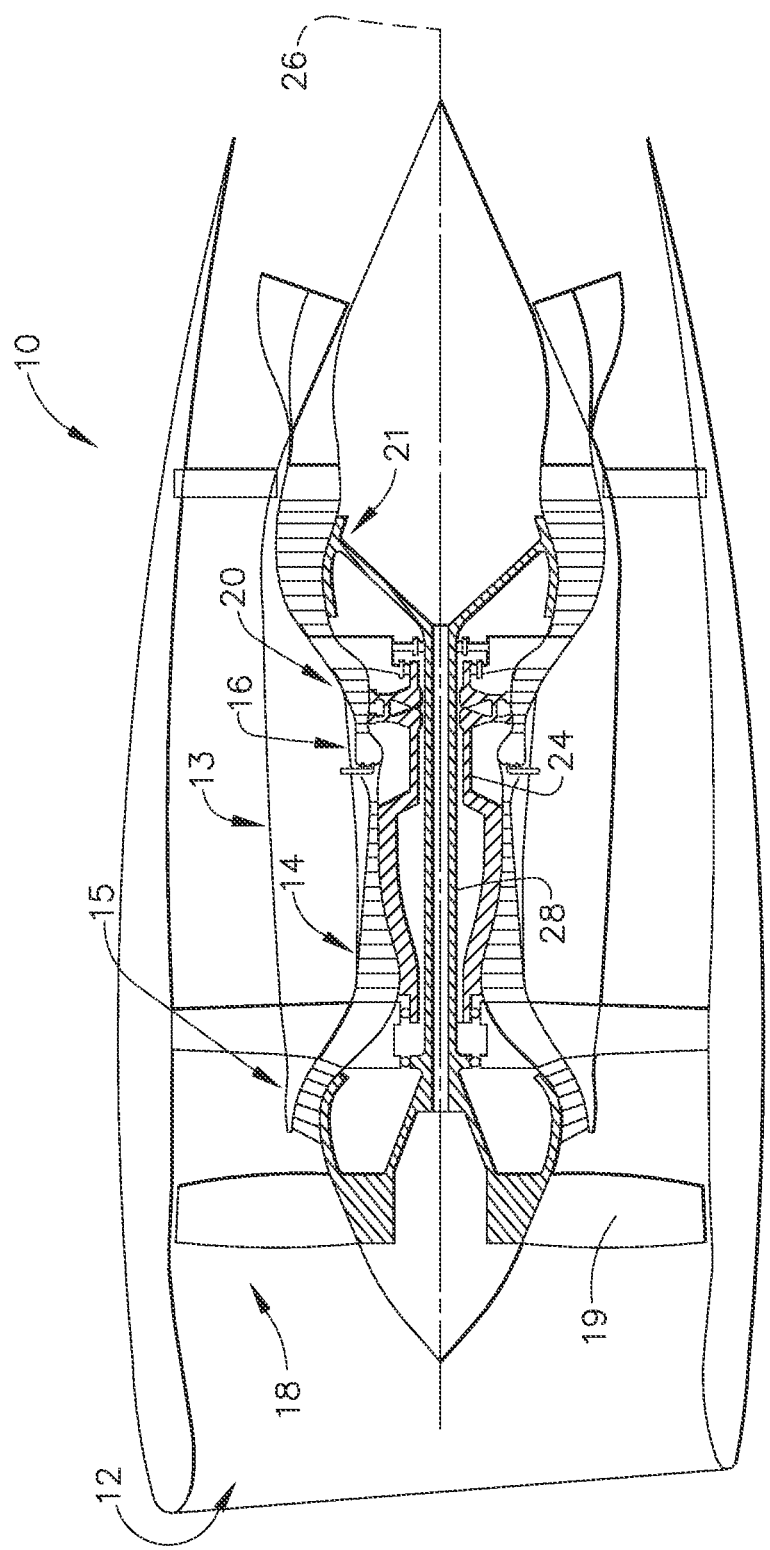
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring now to FIGS. 1-17, various views are depicted which teach impingement inserts which reduce stagnation regions and therefore, particulate accumulation or build-up within an engine component. As a result, engine cooling may be improved. Present embodiments relate to gas turbine engine components which utilize an insert to provide cooling air along a cooled surface of an engine component. The insert provides an array of cooling holes or apertures which are facing the cooled surface of the engine component and direct cooling air onto that cool side surface. The apertures may be formed in arrays and are directed at an oblique angle or a non-orthogonal angle to the surface of the insert and further may be at an angle to the surface of the engine component being cooled. Additionally, the insert may include an array of cooling features extending from the insert surface toward, but not touching, the cooled surface of the component. The present embodiments may be applied to first stage and second stage nozzles for example, as well as shroud hanger assemblies or other components or combinations that utilize impingement cooling and/or are susceptible to particulate build-up resulting in reduced cooling capacity, including but not limited to combustor liners, combustor deflectors and transition pieces. Various combinations of the depicted embodiments may be utilized to form the particulate accumulation mitigation features described further herein.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine center line.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown having an engine inlet end 12 wherein air enters a propulsor 13, which is defined generally by a multi-stage compressor, including for example a low pressure compressor 15 and a high pressure compressor 14, a combustor 16 and a multi-stage turbine, including for example a high pressure turbine 20 and a low pressure turbine 21. Collectively, the propulsor 13 provides power during operation. The gas turbine engine 10 may be used for aviation, power generation, industrial, marine service or the like. The gas turbine engine 10 is axis-symmetrical about engine axis 26 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of a shaft 24.

The engine 10 includes two shafts 24, 28. The axis-symmetrical shaft 24 extends through the turbine engine 10, from the forward end to an aft end for rotation of one or more high pressure compressor stages 14. The shaft 24 is supported by bearings along its length. The shaft 24 may be hollow to allow rotation of the second shaft 28, a low pressure turbine shaft therein. The shaft 28 extends between the low pressure turbine 21 and a low pressure compressor 15. Both shafts 24, 28 may rotate about the centerline axis 26 of the engine. During operation the shafts 24, 28 rotate along with other structures connected to the shafts such as the rotor assemblies of the turbine 20, 21, compressor 14, 15 and fan 18 in order to create power or thrust depending on the area of use, for example power, industrial or aviation.

Referring still to FIG. 1, the inlet 12 includes a turbofan 18 which includes a circumferential array of exemplary blades 19 extending radially outward from the root. The turbofan 18 is operably connected by the shaft 28 to the low pressure turbine 21 and creates thrust for the turbine engine 10.

Within the turbine areas 20, 21 are airfoils which are exposed to extremely high temperature operating conditions. It is desirable to increase temperatures in these areas of the gas turbine engine as it is believed such increase results in higher operating efficiency. However, this desire to operate at high temperatures is bounded by material limitations in this area of the engine. Turbine components are cooled to manage these material limits. For example, shrouds adjacent to rotating blades of the turbine or compressor may require cooling. Additionally, nozzles which are axially adjacent to the rotating blades may also require cooling. Still further, the combustor structures which hold the flame and combustion product gases may be cooled with impingement cooling. These components are collectively referred to as first engine components.

Figure 2:
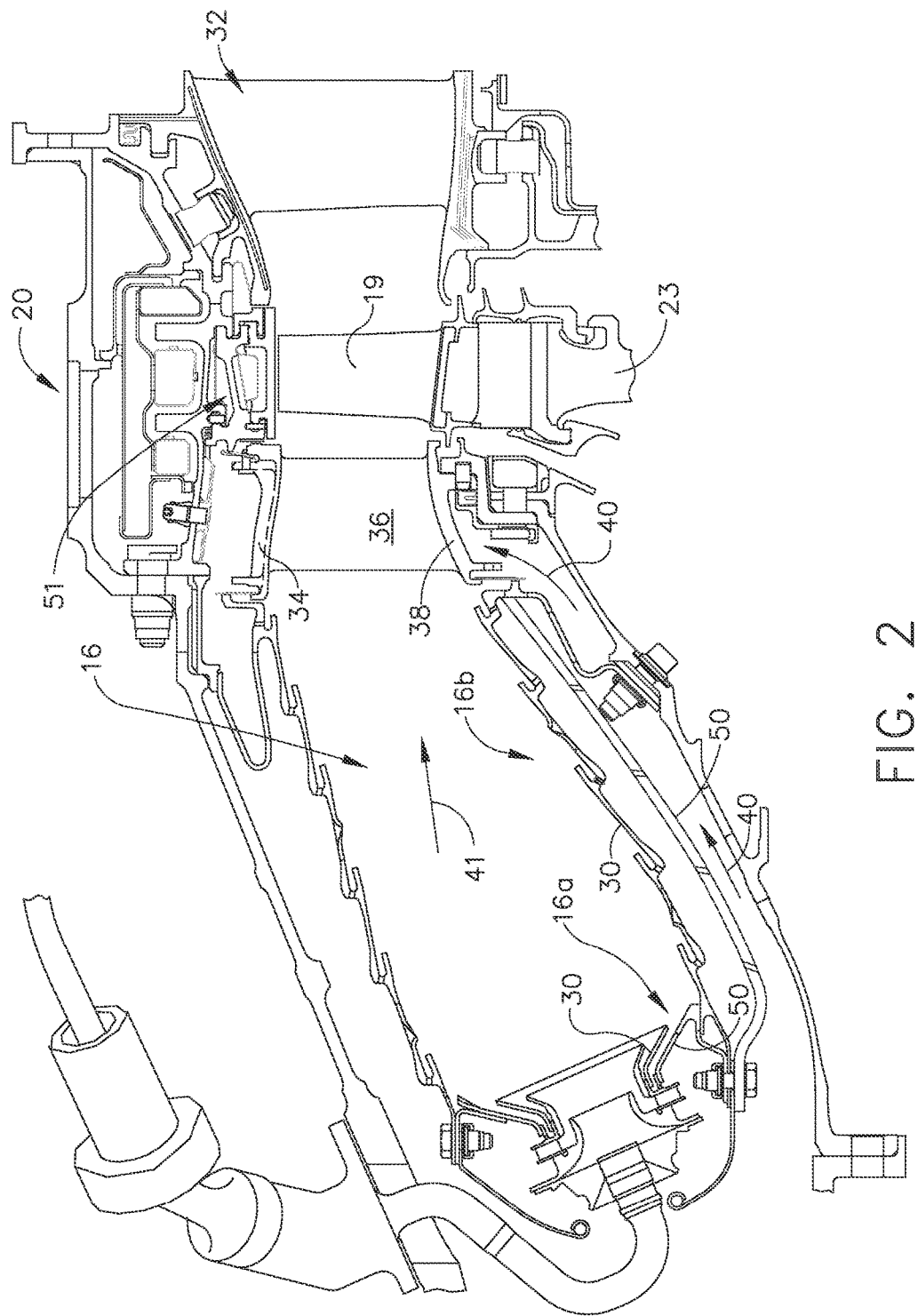
FIG. 2 is a side section view of a portion of the propulsor including a turbine and combustor.

Referring now to FIG. 2, a side section view of a combustor 16 and high pressure turbine 20 is depicted. The combustor 16 is shown having various locations wherein impingement embodiments may be utilized. For example, one skilled in the art will realize upon review of this disclosure that the impingement embodiments defined by first and second components may be used in the area of the deflector 16a or the combustor liner 16b.

The turbine 20 includes a number of blades 19 which are connected to a rotor disc 23 which rotates about the engine center line 26 (FIG. 1). Adjacent to the turbine blades 19 in the axial direction, the first engine component may be embodied by the first stage nozzle 36 which is adjacent to the rotating blade 19 of turbine 20. The turbine 20 further comprises a second stage nozzle 32 aft of the blade 19. The second stage nozzle 32 may also embody the first engine component 30 as described further herein. The nozzles 36, 32 turn combustion gas for delivery of the hot working fluid to the turbine to maximize work extracted by the turbine 20, 21. The nozzle 36 includes an outer band 34, an inner band 38 and an airfoil 36. A cooling flow circuit or flow path 40 passes through the airfoil 36 to cool the airfoil as combustion gas 41 passes along the exterior of the nozzle 36. One area within a gas turbine engine where particulate accumulation occurs is within the nozzle 36, 32 of the turbine 20. The internal cooling circuit 40 which reduces temperature of the components can accumulate particulate and decrease cooling. The exemplary nozzle 32 may acquire particulate accumulation and therefore, mitigation features described further herein may be utilized in a high pressure turbine stage one nozzle 36, or stage two nozzle 32. However, this is non-limiting and the features described may be utilized in other locations as will be discussed further. Additionally, as described further, shroud assembly 51 may require cooling due to the turbine operating conditions.

Figure 3:
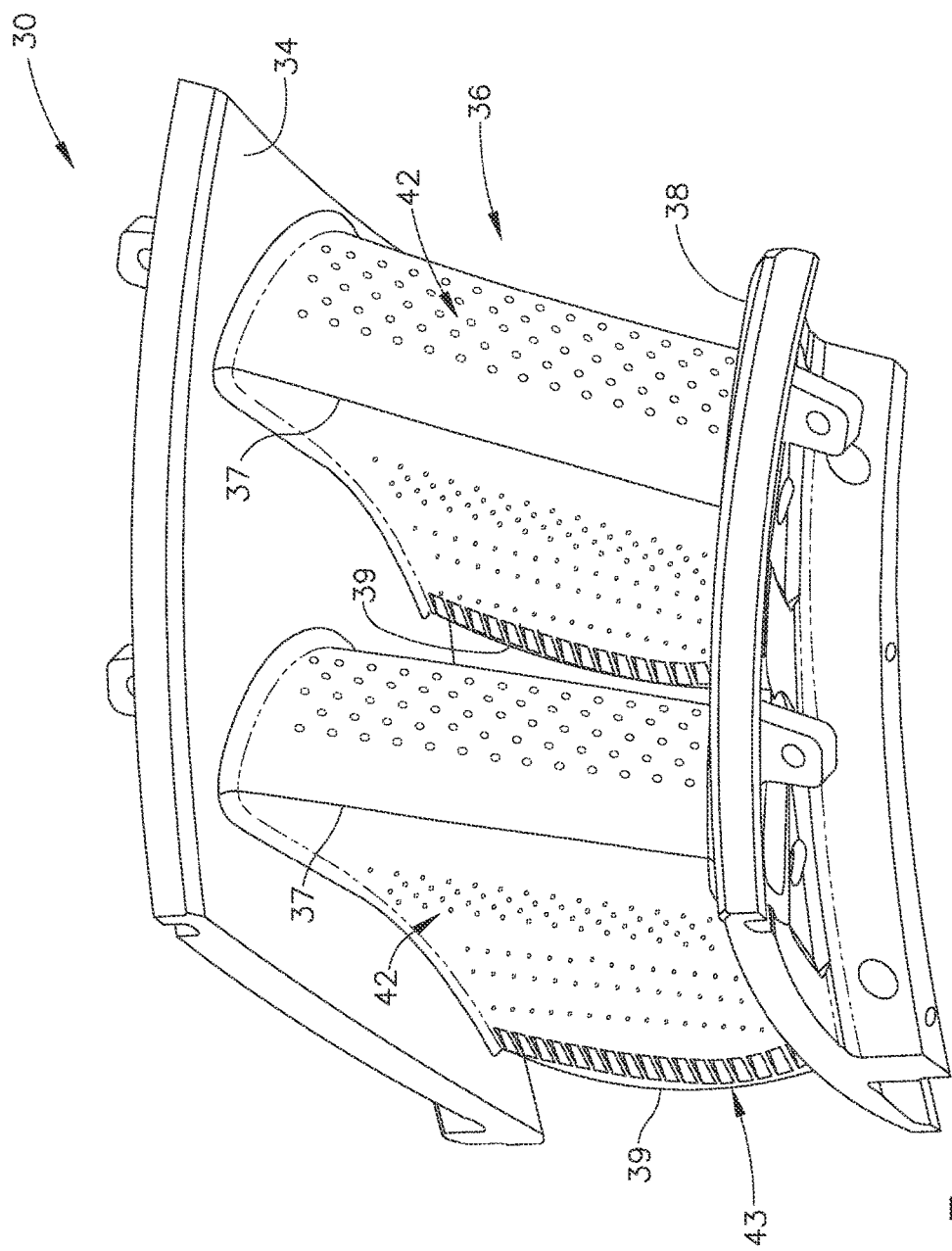
FIG. 3 is an isometric view of an exemplary nozzle utilized in the turbine.

Referring now to FIG. 3, an isometric view of an exemplary nozzle 30 is depicted. The nozzle includes the outer band 34 and the inner band 38, between which an airfoil 36 is located. The airfoil 36 may be completely or at least partially hollow and provide the air flow path or circuit 40 (FIG. 2) through such hollow portion of the airfoil. The airfoil 36 includes a leading edge 37, a trailing edge 39 and a radially outer end and radially inner end. The outer surface of the nozzle receives combustion gas 41 (FIG. 2) from the combustor 16 (FIG. 1). The inner surface of the airfoil 36 is cooled by the cooling flow path 40 to maintain structural integrity of the nozzle 30 which may otherwise be compromised by the high heat in the turbine 20. The outer band and inner band are located at the outer end and inner end of the airfoil, respectively.

The exterior of the airfoils 36 may be formed with a plurality of cooling film holes 42 which form a cooling film over some or all of the airfoil 36. Additionally, the airfoil 36 may include apertures 43 at the trailing edge 39.

Figure 4:
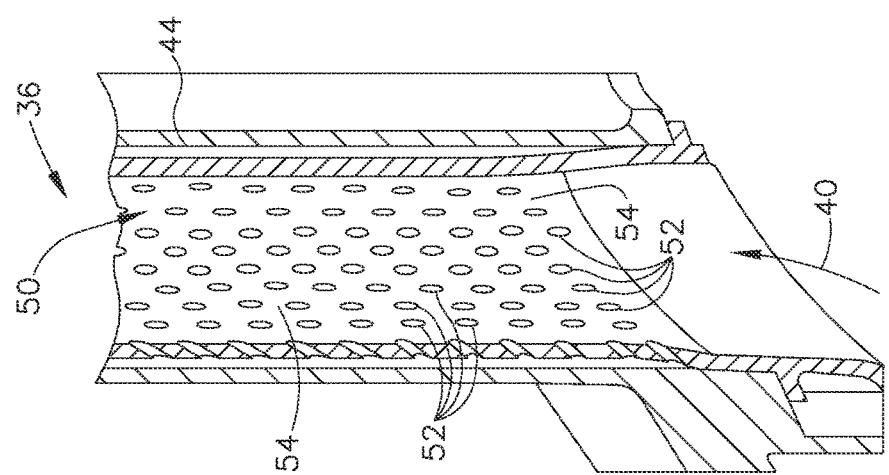
FIG. 4 is a partial section view of an exemplary angled impingement of a second component on a first component.

Referring now to FIG. 4, a partial section view of the nozzle 36, is depicted through a radial section to depict the interior area of the airfoil 36. In this view, the inner or cooling surface of the airfoil 36 is shown. The inner surface 44 is disposed adjacent to the cooling flow path 40. As used with respect to the cooling flow path, the term "adjacent" may mean directly near to or indirectly near to. Within the airfoil 36 is an insert 50 which receives air flow 40 through the hollow space of the airfoil 36 and directs the air flow outwardly to an interior surface of the airfoil 36. An insert 50 may be inserted inside another component, or being inserted between two parts. The insert 50 is made with multiple cooling holes or apertures 52 that allow fluid to flow through the insert. Further, the inserts 50 may be generally sealed around a perimeter to the part being cooled, and therefore, all of the fluid flows through the holes and none goes around the insert. Alternatively, the insert may not be completely sealed and therefore allows some preselected amount of cooling flow path 40 air to bypass the impingement holes 52. The insert flow area and pressure ratio is such that the fluid is accelerated through each impingement cooling hole or aperture 52 to form a cooling impingement jet. The insert 50 is disposed adjacent to the cooling flow path 40, between the cooling flow path 40 and the interior airfoil surface 44 according to one embodiment. The insert 50 includes a plurality of cooling holes or openings 52. The insert 50 directs such cooling air to the airfoil 36 by way of the plurality of openings or cooling holes 52 located within the insert 50. The openings 52 define at least one array 54. The term "array" is utilized to include a plurality of openings which may be spaced both uniformly from one another and non-uniformly at varying distances. An array 54 of holes or apertures formed in an insert 50 is present if in at least the two-dimensional case, e.g. a plane, it requires both X and Y coordinates in a Cartesian system to fully define and locate the hole placements with respect to one another. Thus an array requires the relative spacings in both dimensions X and Y. This plane example could then be understood as applying also to curved inserts as the array is located on the surface curvature. A grouping of holes or apertures would then comprise any array or a portion of an array, especially if the spacings, hole diameters, orientations, and angles are changing from one hole to another, from one row of holes to another, or even from one group of holes to another. A pattern ensues when the same qualifiers are repeated over a number of holes, rows, or groups. Additionally, the arrays 54 may be arranged in groups or patterns wherein the patterns are either uniformly spaced or non-uniformly spaced apart.

Each of the openings 52 extends through the insert 50 at a preselected angle. The angle of each cooling opening may be the same or may vary and may further be within a preselected range as opposed to a specific angle. For example, the angle may be less than 90 degrees. The openings may be in the same or differing directions. The insert 50 directs the cooling air to the cold surface of the airfoil 36, that is the interior surface 44 for example, which is opposite the combustion gas or high temperature gas path 41 traveling along the exterior of the nozzle 30 and airfoil 36.

Figure 7:
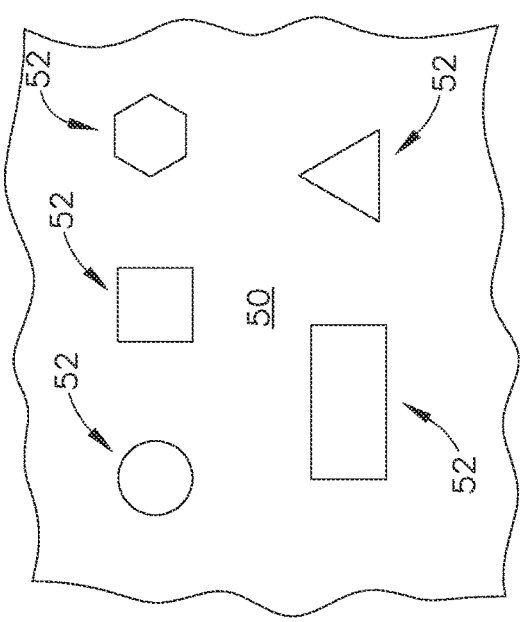
FIG. 7 is a view of various cross-sections of cooling hole openings which may be used with instant embodiments.

Further, the apertures 52 may be formed in a plurality of shapes and sizes. For example any or various closed boundary shapes may be utilized, including but not limited to circular, oblong, polygon, By polygon, any shape having at least three sides and three angles may be utilized. Further, the angles may include radiuses or fillets. According to some embodiments, the apertures are all of a single size. According to other embodiments, the apertures 52 may be of differing sizes. Further, the cross-sectional shapes of the apertures may all be of a single shape or vary in shape. As shown in FIG. 7, a plurality of cross-sectional shapes are shown as exemplary apertures 52 which may be utilized. The sizes and shapes may be tuned to provide the desired cooling or the desired air flow usage through the insert to the inside or cold surface of the airfoil 36. By tuned, it is meant that the sizes and/or shapes may be varied to obtain a desired cooling and/or reduction of particulate build up.

Figure 5:
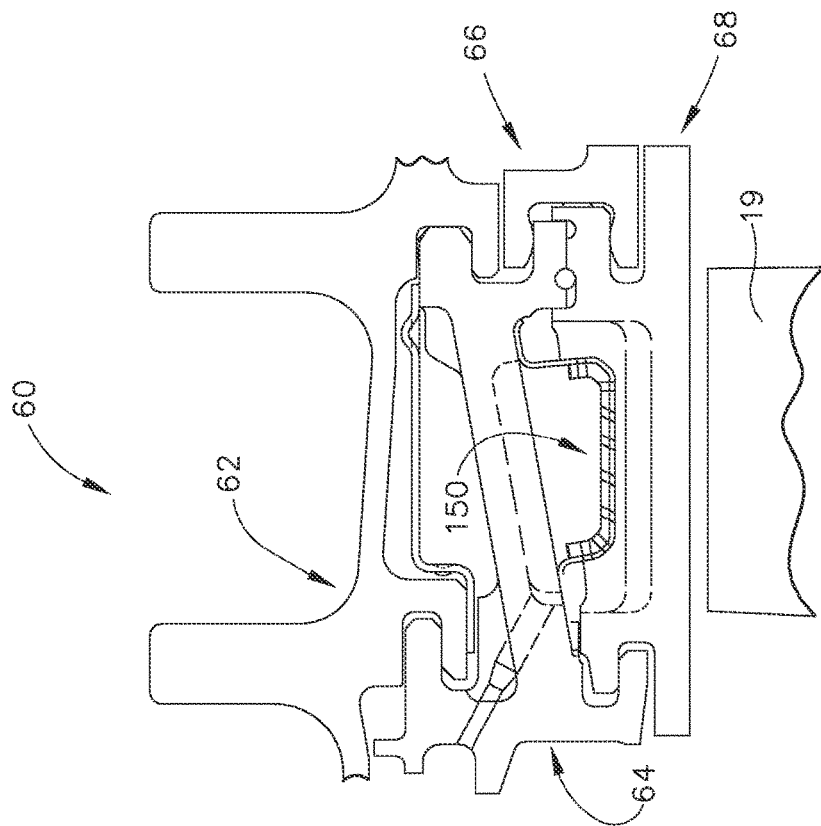
FIG. 5 is a side section view of an alternative embodiment of the angled impingement structure.

According to the embodiments shown in FIG. 5, an alternate utilization of the exemplary particulate mitigation structure is provided. According to this exemplary embodiment, a shroud hanger assembly 60 is shown having an interior insert 150 which cools a cold side of a shroud by way of impingement cooling. The shroud hanger assembly 60 comprises a hanger 62 that includes a first hanger portion 64 and a second hanger portion 66. The hanger portions 64, 66 retain a shroud 68 in position, adjacent to which a blade 19 rotates. It is desirable to utilize cooling fluid moving within or defining the cooling flow path or circuit to reduce the temperature of the insert 150 by way of impingement cooling. However, it is known for prior art shroud hanger assemblies to incur particulate accumulation within this insert area and on the cooling surface of the shroud 68 which over time reduces cooling capacity of the cooling fluid. According to the instant embodiments, the insert 150 may include the plurality of apertures which are angled or non-orthogonal to the surface of the insert and surface of the shroud. In this embodiment, the array 54 of apertures 52 are angled relative to the surface of the insert and the opposite surface of the shroud to limit particulate accumulation in this area of the gas turbine engine.

Figure 6:
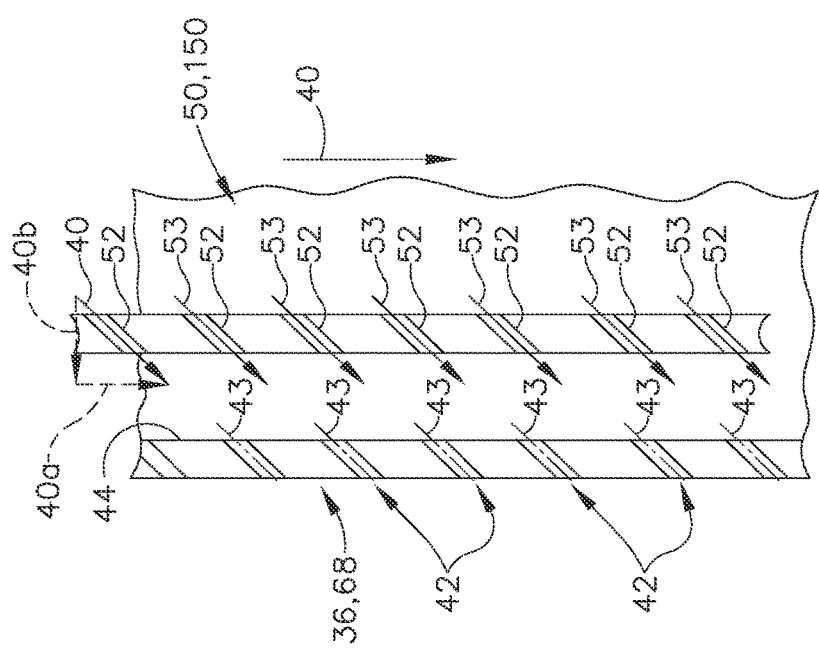
FIG. 6 is a schematic view of the nozzle.

Referring now to FIG. 6, a schematic view of the angled impingement configuration is depicted. The first engine component 30 may be the airfoil nozzle 36 or shroud 68 according to some embodiments. The insert 50, 150 may be the second engine component. The angle of the aperture 52 is defined by an axis 53 extending through the aperture 52. The axis 53 may be angled with the inner or cooled surface 44 or may be aligned or may be unaligned with film holes 42. The holes 42 and cooling aperture 52 may be aligned where the axis 53 of the cooling aperture passes through the cooling film hole 42 or crosses the axis 43 of the cooling film hole at or near the cooling film hole. Alternatively, the axis 53 may not be aligned with the cooling holes 42 so as to impinge the surface 44.

Additionally shown in this view, the relationship of aperture length to diameter ratio may be discussed. The insert 50 may have thickness generally in a horizontal direction for purpose of the description and exemplary depiction. It has been determined that increasing the thickness of the insert may improve the desirable aperture length-to-diameter ratio which will improve performance. Conventional inserts have aperture length-to-diameter ratios generally of less than 1. For the purpose of generating and forming a fluid jet that has a well-defined core region with minimal lateral spreading, the length-to-diameter ratios of angled apertures are desired to be in the range of 1 to 10, and more specifically in the range of 1 to 5. To comply with other desirable engine metrics such as weight, aperture length-to-diameter ratios in the range of 1 to 2.5 are frequently more desirable. The length that is used in this length-to-diameter ratio is defined as the portion of the aperture centerline axis that maintains a complete perimeter for the cross-section taken perpendicular to the axis. Further, the thickness of the insert 50 may be constant or may vary. Still further, it will be understood by one skilled in the art that the aperture cross-section may change in area as a function of its length while keeping the same basic shape, i.e. it may expand or contract. Accordingly, the aperture axis may define a somewhat or slightly arcuate line, not necessarily a perfectly straight line.

The cooling fluid or cooling air flow 40 is shown on a side of the airfoil 36 and also adjacent to the insert 50, 150. The insert 50 includes an array defined by the plurality of apertures 52 located in the insert and which direct the air outwardly at an angle relative to the inside surface of the component 50, 150. The nozzle 30 may also comprise a plurality of cooling holes 42 which may be at an angle to the surface as depicted but may be at any angle to the nozzle surface. With this embodiment, as with the previous embodiment, the array of cooling openings may be of various sizes and shapes wherein the apertures may be uniformly spaced or may be non-uniformly spaced and further wherein the pattern or arrays may be uniformly spaced or non-uniformly spaced apart. The cooling apertures 52 may also be of one uniform cross-sectional shape or of varying cross-sectional shapes and further, may be of uniform size or varying size or formed in a range of sizes.

Also shown in FIG. 6, is the passage of the cooling air 40 through one of the apertures 52. This is shown only at one location for sake of clarity. The flow of cooling fluid 40 is made up of two components. The first axial component $40a$ may be an average fluid velocity tangent to the cooled surface 44. The second radial component $40b$ may be an average fluid velocity normal to the cooled surface 44. These two components $40a$, $40b$ are not shown to scale but define the vector of the cooling fluid 40 exiting the cooling apertures 52. The components $40a$, $40b$ may also define a ratio which may be between 0 and 2. According to some embodiments, the ratio may be between 0.3 and 1.5. According to still further embodiments, the ratio may be between 0.5 and 1.

Additionally, it should be understood by one skilled in the art that the cooling apertures 52, 152 or others described may be aimed in three dimensions although only shown in the two dimensional figures. For example, a cooling aperture 52 or any other embodiment in the disclosure may have an axis 53 which generally represents the cooling flow 40 passing through the aperture. The axis 53 or vector of the cooling flow 40 through the aperture 52 may be defined by at least two component, for example a radial component ($40b$) and at least one of a circumferential or axial component ($40a$). The vector may be aimed additionally by varying direction through the third dimension, that is the other of the circumferential or axial dimension, some preselected angular distance in order to provide aiming at a desired location on the surface of the opposed engine component, or a specific cooling feature as discussed further herein. In the depicted embodiment, the third dimension, for example the circumferential dimension, may be into or out of the page.

Figure 8:
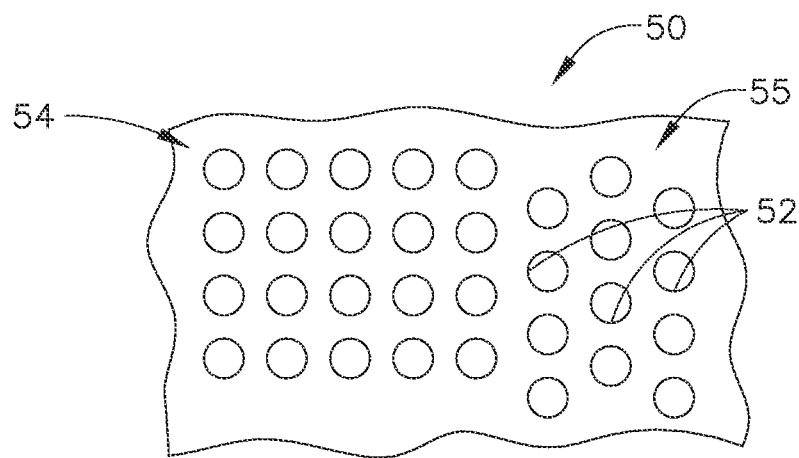
FIG. 8 is a view of an array including uniformly spaced apertures which may or may not be staggered.

Referring now to FIG. 8, a view of an exemplary second component surface is depicted, for example component 50 or 150. The surface includes an array 54 of apertures 52. The array 54 may be formed of rows of apertures 52 extending in first and second directions. According to one embodiment, the array 54 is shown having a uniform spacing of apertures 52. The apertures 52 in one direction, for example, the left to right direction shown, may be aligned or alternatively may be staggered so that holes in every other row are aligned. The staggering may occur in a second direction, such as a direction perpendicular to the first direction. A plurality of these arrays 54 may be utilized on the insert 50 or a mixture of arrays 54 with uniform size and/or shape may be utilized. A single array may be formed or alternatively, a plurality of smaller arrays may be utilized along the part. In the instant embodiment, one array 54 is shown with uniform spacing and hole size and shape, on the left side of the figure. On the right side of the figure a second array is shown with apertures 52 of uniform spacing, size and shape, but the rows defining the array 55 are staggered or offset.

Figure 9:
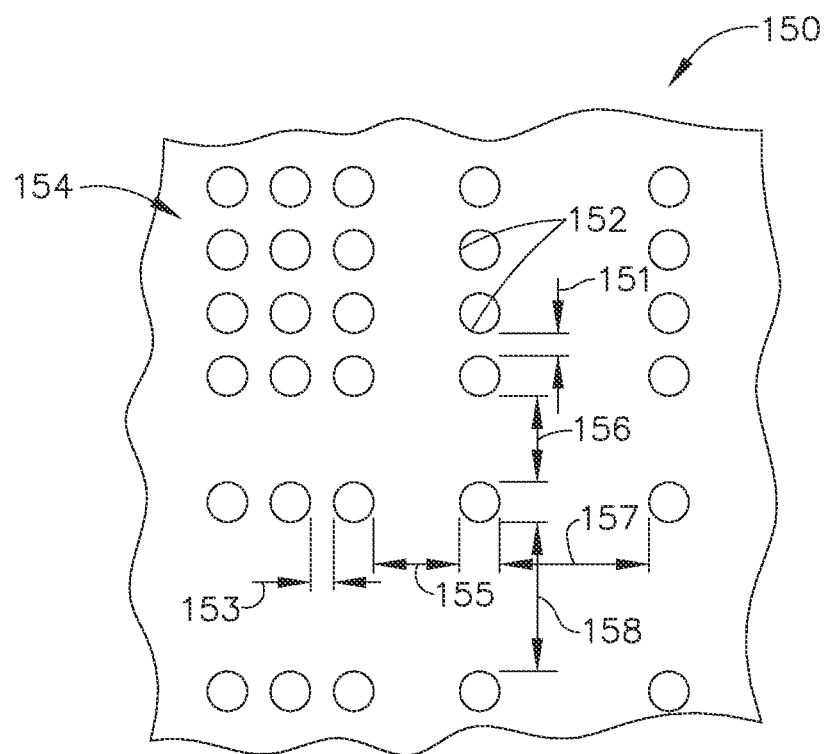
FIG. 9 is a view of an array including non-uniformly spaced apertures.

With reference to FIG. 9, a plurality of arrays is again shown. However, in this embodiment the arrays 154 are non-uniformly spaced apart and additionally, the apertures 52 may be non-uniformly spaced apart. Such spacing may be dependent upon locations where cooling is more desirable as opposed to utilizing a uniformly spaced array which provides generally equivalent cooling at all locations.

The array 154 has a first plurality of apertures 152 which are spaced apart a first distance 153. The apertures 152 are additionally shown spaced apart a second distance 155 which is greater than distance 153. The apertures 152 have a further spacing distance 157 which is greater than spacings 153 and 155. All of these spacings are in the first direction. Further the spacing of apertures 152 may vary in a second direction. For example, the apertures 152 are shown with a first spacing 151, 156 and 158 all of which differ and all of which therefore vary row spacing of the array 154.

Thus, one skilled in the art will appreciate that, regarding these embodiments, the arrays 154 of apertures 152 may be formed in uniform or non-uniform manner or a combination thereof It should be understood that non-uniform apertures may form arrays which are arranged in generally uniform spacing. Similarly, the apertures may be uniformly spaced and define arrays which are non-uniform in spacing. Therefore, the spacing of apertures and arrays may or may not be mutually exclusive. Still further, the apertures 152 may be formed of same or varying sizes and cross-sectional areas as previously described.

Figure 10:
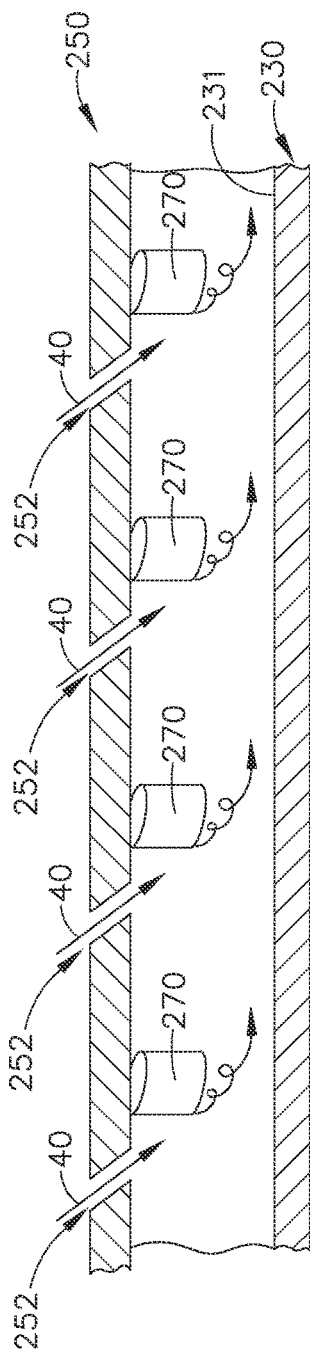
FIG. 10 is a side schematic view of an exemplary embodiment of angled impingement holes and cooling features located on the insert.

Referring now to FIG. 10, a side schematic section view is depicted. The view shows a first engine component 230 spaced from a second engine component 250. The second engine component includes a plurality of apertures 252 which define an array as described in previous embodiments. The apertures 252 are generic and may be embodied by any of the previous embodiments or combinations of embodiments described.

Extending from the inner surface of the component 250, which faces the first engine component 230, are a plurality of cooling features 270. The cooling features 270 interact with the air flow 40 passing through the apertures 252 to create turbulence and vortices in the gap between the first and second engine components 230, 250.

Figure 11:
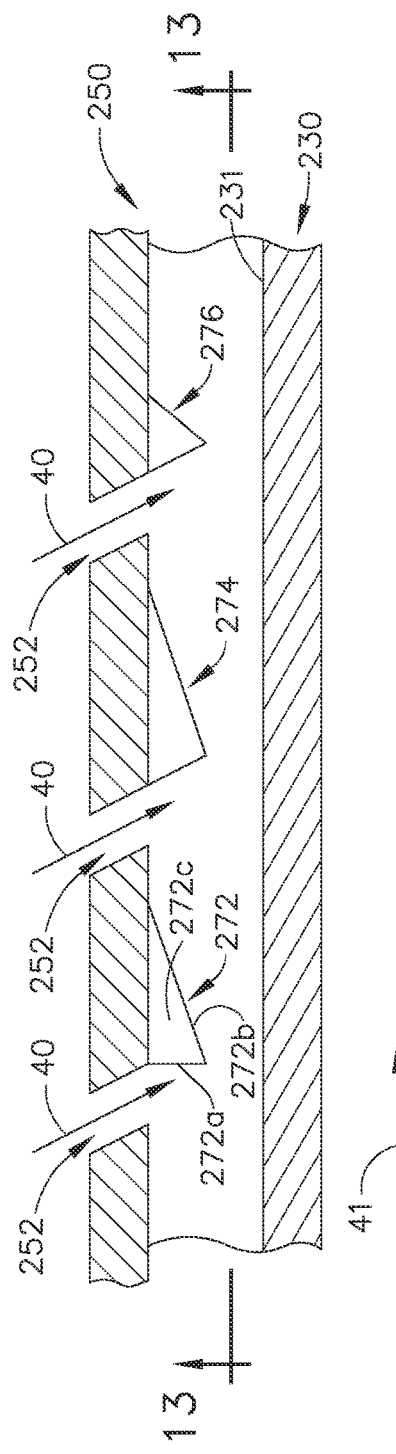
FIG. 11 is a schematic view of an exemplary plurality of angled cooling apertures of an insert including cooling features extending therefrom.

Referring now to FIG. 11, a side schematic view of an exemplary construction is provided including first and second engine components 230, 250 is depicted. In this view, various embodiments of cooling features 270 are shown and described. The first engine component 230 is shown spaced apart from a second engine component 250. The first engine component 230 may be for non-limiting example a nozzle, a shroud, a combustor liner, combustor deflector or other transition pieces as with previous non-limiting embodiments. The second engine component 250 may include an insert having a plurality of impingement cooling holes 252 including any of the previous embodiments or combinations of previous embodiments. The second engine component 250 is disposed adjacent to the first engine component 230, with a gap therebetween, and receives cooling fluid defining a cooling flow path 40. The cooling fluid, for example compressed air, in the cooling air flow path 40 passes through the impingement cooling holes 252 to the first engine component 230.

In the depicted embodiment, beneath the cooling apertures 252 and spaced opposite the first component 230, which may represent the insert, is the first component 230. A hot combustion gas path 41 is shown passing along a hot surface, for example the lower surface of component 230. The upper surface of the component 230 is a cooling surface 231 which is impingement cooled.

The second engine component 250 may further comprise a plurality of cooling features 270 extending from the second engine component 250 toward the first engine component 230. However, the discreet cooling features 270 do not touch the first engine component 230. The cooling features 270 may be arranged as a plurality of fins, for example and which may be staggered (offset) or may be aligned along the direction of cooling flow path 40 with the plurality of impingement jets or apertures 252 also located in the second engine component 250. In operation, the axes cooling apertures 252 may be aligned or may be staggered relative to the discreet cooling features 270 depending on whether the axes of the cooling apertures 252 intersect or impinge on the features 270 or the cooling surface 231 of the first engine component 230.

The first engine component 230 may comprise various structures. For example, the first engine component 230 may be a nozzle airfoil as previously described or alternatively, may be a turbine shroud. Additionally, the first engine component 230 may comprise portions of a combustor or other engine components and therefore should not be considered limited to the parts described herein. The second engine component 250 may comprise a baffle or insert which is located adjacent to the first engine component 230 for providing impingement cooling thereof. During operation, cooling fluid 40 moves adjacent to the insert 250 and passes through the cooling apertures 252 such that the cooling fluid 40 engages the array of cooling features 270 and creates vortices to provide improved heat transfer while forcing dust and other particulate to continue moving along the engine component surface 230 rather than adhering thereto. However, it should be understood that it is not necessary that the cooling fluid engage the feature 270 initially. In some embodiments, the cooling fluid may impinge the cooled surface and the post impingement coolant may then engage the features 270 which may vary the reaction of the cooling fluid in some manner. The discrete cooling features 270 may take various shapes, geometries, forms and various types are shown extending from the surface of component 250 into the gap between engine components 230, 250. For example, the cooling features 270 may vary in width or have a constant width. Further, the cooling features 270 may have a length and a height wherein the length and height are substantially equal or not substantially equal. The side view, as shown in FIGS. 10 and 11 depict that the cooling features 270 may include polygonal, cylindrical, triangular or other shapes, any of which may include sharp corners or alternatively may have curved or radiused corners in order to improve aerodynamics. By polygon, it is meant that the cooling features 270 have at least three straight sides and angles as shown in side view. Further, it should be understood that it is also not necessary that edges of features 270 line up exactly with apertures 252. The features 270 may be staggered or offset relative to the apertures 252.

Figure 13:
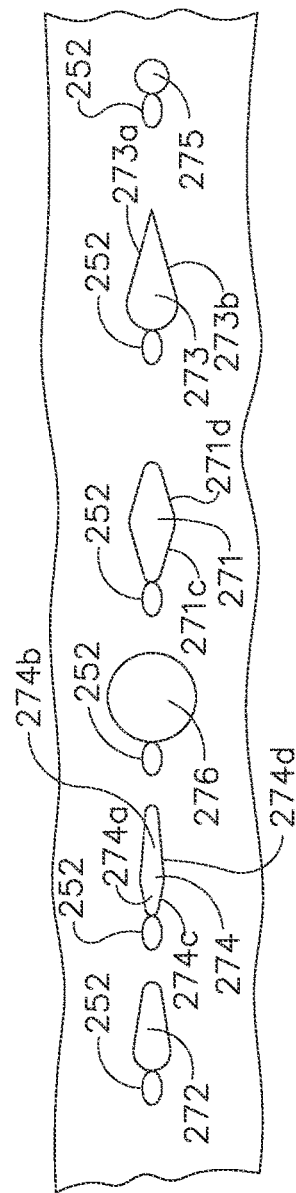
FIG. 13 is a bottom view of the plurality of cooling features of FIGS. 11 and 12.

Referring now to FIG. 11 and FIG. 13, which depict a bottom view of the discrete cooling features 270, various embodiments of the discrete cooling features 270 are shown depending from the second engine component 250. According to a first embodiment shown at the left side of the engine component 250, the cooling feature 272 may be triangular shaped and have a vertical or radial side wall in profile depending from the engine component 250. The forward wall 272a may be semicircular in cross-section and depend vertically from the first engine component 250, according to the exemplary orientation depicted. From a lowermost point of the forward wall 272a, a second wall 272b of the cooling feature 272 may taper upwardly toward the component surface 250.

The first alternative cooling feature shape 272 has a vertical side wall 272c which may alternatively be linear or curvilinear. The cooling feature 270 is generally triangular in shape. The forward wall of the triangular fin 272 may have a wider profile round cross-section and may taper back in the aft direction to a more narrow profile which may also have a round cross-section. Alternatively, the narrow end may be forward (to the left) and may widen moving aft (to the right). The feature 272 may be tapered in width to provide the desired aerodynamic effect for the cooling feature or fin 270.

Referring now to the second cooling feature alternative embodiment, a cooling feature 274 is shown depending from the first engine component 250. The cooling feature 274 is also triangular in side view or side section shape but includes side walls of differing lengths so that the triangle has different lengths of side wall legs. Whereas the first embodiment 272 is a right triangle having two equal length sides, the cooling feature 274 is not a right triangle and has different angles of sides.

Also differing from the first embodiment, side walls 274c vary in width between a forward end of the feature 274 and an aft end of the feature 274. According to the exemplary embodiment, the feature 274 widens from the forward end to an intermediate location and narrows between the inner media location and the aft end. The variation of thickness however may be formed an alternative configurations. Further, the feature has an upper surface 274a which depends to a lowermost point at the intermediate location and a second surface 274b which tapers upwardly to the aft end. In this embodiment, the intermediate location or lower peak of the feature 274 is not centered between the forward end and the aft end. However, such alternative geometry may be utilized.

Figure 12:
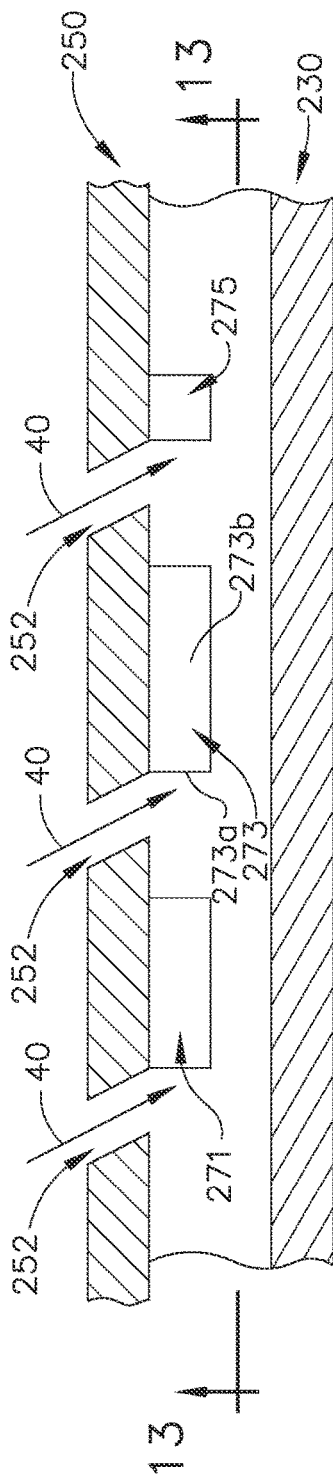
FIG. 12 is a schematic of an exemplary plurality of angled cooling apertures of an insert including a second embodiment of cooling features extending therefrom.

A third embodiment of the cooling features 276 is generally depicted as an equilateral triangle which depends downwardly from the engine component 250. As discussed previously, the lower peak of the cooling feature 276 is centered between forward and aft ends. The bottom view of FIG. 12 shows that the shape of the cooling feature 276 may be conical. However, other shapes may be utilized and these embodiments are non-limiting and not exhaustive.

Referring now to FIG. 12, additional embodiments of cooling features 270 are shown depending from the insert 250 and are described. These embodiments differ in side view from the embodiments of FIG. 10. According to instant embodiments, the features 270 have a geometric shape which is other than triangular. For example, the instant embodiments may be rectangular or square in side view.

The side view shows the feature 271 is generally rectangular shaped. The discrete cooling feature 271 is shown in FIG. 13 with a forward radius of a first size and an aft radius of substantially the same size. When viewed from below, in FIG. 12, the feature 271 is generally diamond shaped. The forward end and the aft end of the feature 271 extend vertically from the component 230. The cooling feature or fin 271 has side walls 271c which increase in thickness from the forward to the middle location due to the radius of the cross-section at the central location, in the forward to aft (left to right) direction along the feature 271. Beyond the center location, the feature sidewall 271d decreases in thickness to a smaller radius size at the aft end of the feature 274, where the feature is narrow, as is the forward end. Thus, as compared to the second embodiment 274 wherein the intermediate change in dimension occurred closer to the forward end of the fin and the aft end, the present embodiment 271 has a central location where the feature has its widest location in the direction of flow 40. However, this is not limiting as the widest area need not be at the center. As shown in the side view of FIG. 12, the embodiment looks substantially rectangular in profile as the forward and aft walls are generally vertical. However, it is within the scope of the embodiment that the forward and aft walls be angled according to other embodiments described.

Referring to the fifth embodiment of FIG. 12, the side view shows a generally square or rectangular shaped discrete cooling feature or fin 273. The feature 273 has forward wall 273a is substantially vertical as with the previous embodiment and the first embodiment. The first wall 273a has a radius dimension providing the round forward end of the feature 273. The feature 273 further comprises sidewalls 273b (FIG. 12) which taper back to an aft vertical wall. The aft end may be pointed rather than radiused as in previous embodiments. The embodiment is shown more clearly in FIG. 13 with the forward dimension of the cooling feature having a larger radius dimension which decreases down to a point at the aft end of the fin.

As shown in FIG. 12, the final embodiment is generally cylindrically shaped cooling feature 275 having a round cross-section. This embodiment may be defined as a cylindrical structure rather than a fin shape. As previously discussed, these embodiments may be used together or a single embodiment may be utilized and spaced apart from one another. Additionally, other embodiments are possible wherein combinations of features of the various embodiments may be used to form additional discrete cooling features.

Referring again to FIGS. 11-13 collectively, various of the embodiments of cooling features 270, the cooling air flow 40 is depicted as arrows passing through the apertures 252. The aiming of the cooling apertures 252 may be discussed by the axis of the aperture 252 which corresponds to the depicted arrows representing the fluid flow 40 therethrough. The cooling features 270 may be oriented in at least two manners relative to the cooling holes 252. According to some embodiments, the features 270 are aligned with the cooling holes 252 wherein the axis of the cooling hole 252 intersects or impinges the features 270. According to alternate embodiments, the features 270 are staggered relative to the cooling holes 252 and offset (into the page) from direct alignment with the apertures 252. In this embodiment, the axis of the cooling holes 252 may not engage the features 270 but instead, may engage the surface 231 of component 230, while however still creating flow swirl. Further, the features 270 may be spaced apart uniformly or may be spaced apart non-uniformly. Still further, the features 270 of the engine component 230 may define one or more patterns wherein the multiple patterns may be spaced apart in a uniform manner or may be spaced in a non-uniform manner in ways previously discussed with the cooling holes.

In the embodiment, where the cooling features 270 are aligned with the cooling features 252, the features 252 may be positioned such that the cooling air 40 is aligned with the forward walls of the features 270. Alternatively, the cooling air may be directed to engage the lower surfaces of the cooling features 270. Still further, the cooling air may engage alternate locations of the cooling features 270.

With reference to FIG. 13, it should also be understood from this view, by one skilled in the art, that the apertures or openings 252 may be moved relative the embodiments of the cooling features 270. Likewise the cooling features, collectively 270, may be moved relative to the openings 252. Additionally, the angles of the apertures 252 may be varied to various non-orthogonal positions to impinge the cooling features 270 at various positions or impinge the opposite surface of the engine component 230. Thus, any or all of these methods of varying the impingement location may be utilized.

Figure 14:
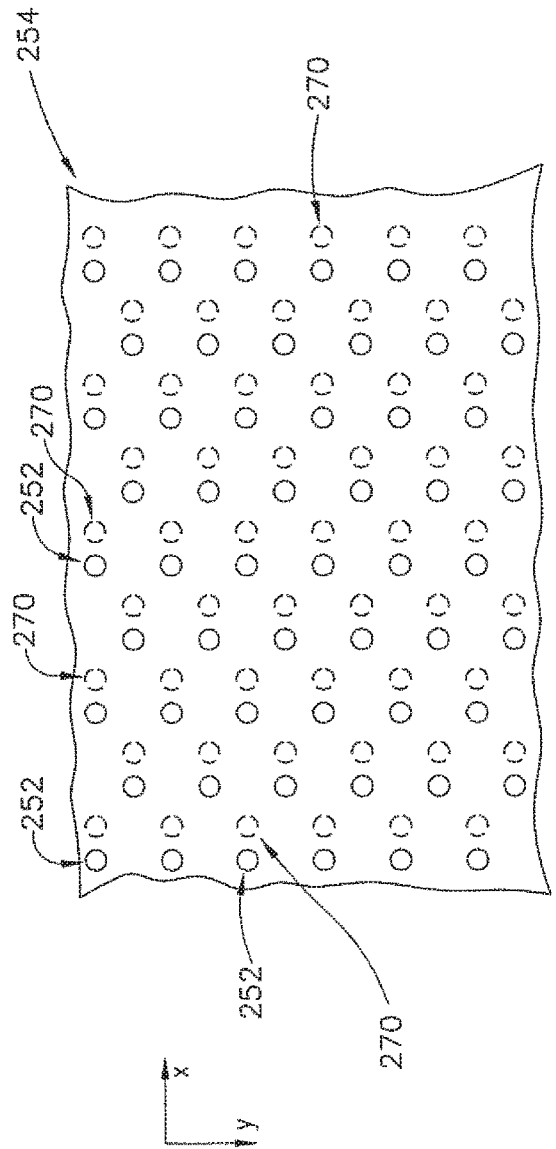
FIG. 14 is a top view of an array of uniform spacing with cooling apertures impinging upon the cooling features.
Figure 15:
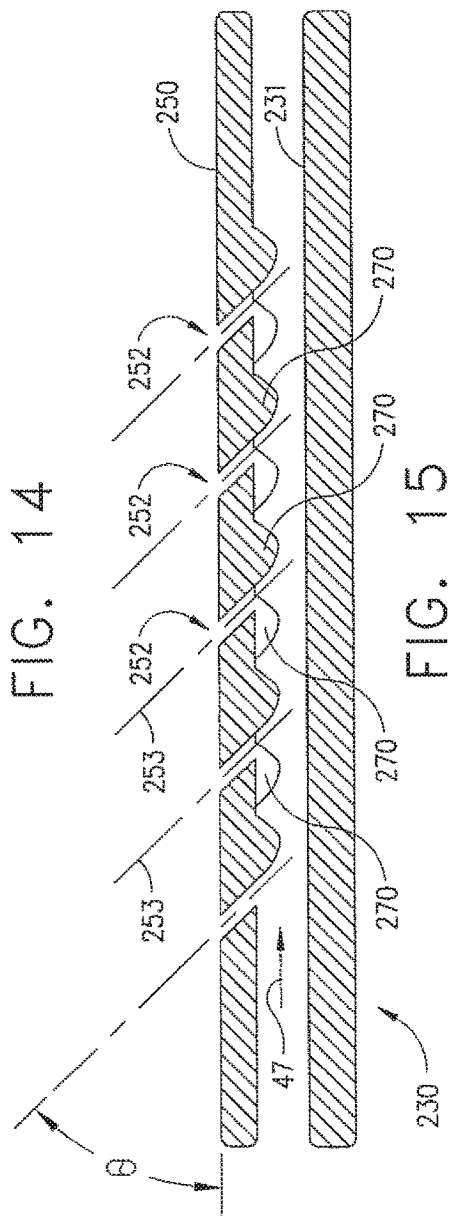
FIG. 15 is a side section view of the embodiment of FIG. 14.

Referring now to FIGS. 14-17, description is provided for the arrays 254, 354 which may be defined by apertures of the previous embodiments in combination with cooling features of the previous embodiments. Referring now to FIG. 14, a top view of an embodiment is shown having various exemplary discussed features desired for use in exemplary components. In the top view, the arrangement of cooling apertures 252 are shown in an array 254 wherein the apertures 252 are aligned with the features 270. These features 270 are below the surface of engine component 250 as indicated in FIG. 15, but are shown for purpose of illustration in this view. The array 254 is defined in this example by an x-axis of first rows and a y-axis of second rows. The array of apertures 254 is staggered meaning that immediately a first row, for example in the x-axis direction, is offset by some amount in the x-direction to the adjacent row in the x-direction. The same may be said for the rows of the y-direction. In this embodiment the spacing between apertures 252 is uniform but alternatively, may be non-uniform as previously described.

Referring now to FIG. 15, the side section view of the view of FIG. 14 is shown. The apertures 252 are defined in part by axes 253 which also define a direction of flow of cooling fluid through apertures 252. As described, the features 270 are protruding from the second engine component 250.

According to the instant embodiment, the axis 253 of each of the cooling holes 252 depicts that the impingement point of the cooling flow 40 (indicated by axis 353) passing therethrough engages the cooling feature 270. This is due to the alignment in the x-direction (FIG. 12) with the aperture axes 253 for impingement of cooling fluid on the features 270. More specifically, the cooling flow 40 engages the forward edge or surface of the feature 270 at the section cut depicted. However, alternative embodiments may provide that the features 270 are not aligned with the impingement apertures but instead are offset, for example in the y-direction (FIG. 14) relative to the apertures 253.

With regard now to FIG. 16, a top view of an alternate array 354 is shown. Again the view depicts both the apertures 352 and the features 370, which is actually beneath the depicted component 350. The apertures 352 are formed in the array 354 which is of uniform spacing, although non-uniform spacing may be utilized as described in previous embodiments. The rows are also staggered and are staggered in the x and y direction. Further however, other embodiments may have rows which are aligned rather than staggered as with the previous embodiment.

With reference now to FIG. 17, a side section view of the embodiment of FIG. 16 is shown. The array 354 includes apertures 352 located in the first component 350. An array is also provided of the cooling features 370 which protrude from the second component 330.

In this embodiment, the axes 353 show the direction of cooling flow for the cooling fluid 40 passing through the insert 350 toward the first engine component 330. In this embodiment, the impingement occurs between the cooling features 370 rather than on the cooling feature as with the embodiment of FIG. 15. As noted previously, the impingement on the surface 331 may also occur by offsetting the features 370 corresponding to an aperture 352 away from the aperture, for example in the y-direction. Additionally, the angle of the aperture axes 253 and 353 differ and may provide a further means of adjusting the impingement of the axes 253, 353 on or around the features 270, 370.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An engine component assembly for impingement cooling, comprising:
    an engine component having a cooled surface;
    said engine component having a flow path on one side of said cooled surface;
    an insert disposed adjacent to said engine component between said flow path and said engine component, said insert having a plurality of openings forming an array through said insert, said cooling flow path passing through said plurality of openings to cool said cooled surface;
    said insert having a surface facing said cooled surface of said engine component;
    a plurality of discrete cooling features extending from said insert surface into a gap between and toward said cooled surface of said engine component and defining an array, wherein a forward wall of at least one cooling feature of the plurality of cooling features has a semicircular cross-section; and,
    said openings extending through said insert at a non-orthogonal angle to said insert surface; and,
    wherein the array comprises a staggered array, the staggered array comprising a first row and a second row, wherein the second row is offset by a distance in a first direction from the first row.

2. The engine component assembly of claim 1, said plurality of discrete cooling features having a polygonal shape in side view, wherein the staggered array is staggered in both an X and a Y direction.

3. The engine component assembly of claim 2, wherein at least one cooling feature of said plurality of discrete cooling features being one of triangular, square or rectangular.

4. An engine component assembly for impingement cooling, comprising:
    an engine component having a cooled surface;
    said engine component having a flow path on one side of said cooled surface;
    an insert disposed adjacent to said engine component between said flow path and said engine component, said insert having a plurality of openings forming an array through said insert, said cooling flow path passing through said plurality of openings to cool said cooled surface;
    said insert having a surface facing said cooled surface of said engine component;
    a plurality of discrete cooling features extending from said insert surface into a gap between and toward said cooled surface of said engine component and defining an array, wherein a forward wall of at least one cooling feature of the plurality of cooling features has a semicircular cross-section; and,
    said openings extending through said insert at a non-orthogonal angle to said insert surface; and
    each of said array of said cooling features being offset from at least one of said opening in said insert wherein an axis of said opening intersects said cooled surface, and wherein at least one cooling feature of said cooling features is generally diamond shaped.

5. The engine component assembly of claim 4, said offset being in a second direction, wherein at least one cooling feature of said cooling features has a cross-sectional area that forms an equilateral triangle.

* * * * *